US011126939B2

(12) United States Patent
Mappus et al.

(10) Patent No.: US 11,126,939 B2
(45) Date of Patent: Sep. 21, 2021

(54) TELECOMMUNICATION NETWORK CUSTOMER PREMISES SERVICE DISPATCH OPTIMIZATION

(71) Applicant: AT&T Intellectual Property I, L.P., Atlanta, GA (US)

(72) Inventors: Rudolph Mappus, Plano, TX (US); Vijayan Nagarajan, Plano, TX (US); Abhay Dabholkar, Allen, TX (US); Billy Langston, Jr., Fort Worth, TX (US); Matthew Rosenbloom, Dallas, TX (US); Quan Nguyen, McKinney, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 195 days.

(21) Appl. No.: 16/212,393

(22) Filed: Dec. 6, 2018

(65) Prior Publication Data
US 2020/0184405 A1 Jun. 11, 2020

(51) Int. Cl.
*G06Q 10/06* (2012.01)
*G06N 5/02* (2006.01)
*G06Q 10/04* (2012.01)

(52) U.S. Cl.
CPC ....... *G06Q 10/063112* (2013.01); *G06N 5/02* (2013.01); *G06Q 10/04* (2013.01)

(58) Field of Classification Search
CPC ........... G06Q 10/00–50/00; G06N 3/00–20/00
USPC .............................................. 705/7.11–7.42
See application file for complete search history.

(56) References Cited

U.S. PATENT DOCUMENTS

| 5,682,421 | A | 10/1997 | Glovitz et al. |
| 5,920,846 | A | 7/1999 | Storch et al. |
| 6,898,435 | B2 | 5/2005 | Milman |
| 6,961,415 | B2 | 11/2005 | Doherty et al. |

(Continued)

OTHER PUBLICATIONS

Weigel, Don, and Buyang Cao. "Applying GIS and OR techniques to solve Sears technician-dispatching and home delivery problems." Interfaces 29.1 (1999): 112-130. https://pdfs.semanticscholar.org/29b3/da27ed5404074cf696b80088240f04b81416.pdf.

(Continued)

*Primary Examiner* — Alan S Miller (57) ABSTRACT

A processing system may obtain historical job feature, network plant feature, and calendar feature data associated with customer premises installation jobs of a telecommunication network which include a dispatch of a customer premises technician. A plurality of the customer premises installation jobs may further include a dispatch of a network-based technician. The processing system may then generate, from the historical data, a prediction model for predicting whether additional customer premises installation jobs may include a dispatch of a network-based technician, apply the prediction model to job feature, network plant feature, and calendar feature data associated with a pending customer premises installation job, determine a likelihood score of whether the pending customer premises installation job may include a dispatch of a network-based technician based upon the prediction model, and assign the pending customer premises installation job to at least a first customer premises technician in accordance with the likelihood score.

19 Claims, 3 Drawing Sheets

(56) References Cited

U.S. PATENT DOCUMENTS

| | | | |
|---|---|---|---|
| 6,970,829 B1* | 11/2005 | Leamon | G06Q 10/06 |
| | | | 705/7.14 |
| 6,990,458 B2 | 1/2006 | Harrison et al. | |
| 7,206,384 B2 | 4/2007 | Beyda | |
| 7,209,817 B2 | 4/2007 | Abdel-Malek et al. | |
| 7,346,531 B2* | 3/2008 | Jacobs | G06Q 10/0631 |
| | | | 705/7.15 |
| 7,433,830 B2 | 10/2008 | Ingman et al. | |
| 7,464,046 B2 | 12/2008 | Wilson et al. | |
| 7,840,434 B2 | 11/2010 | Ingman et al. | |
| 8,028,807 B2 | 10/2011 | Deplazes et al. | |
| 8,219,436 B2 | 7/2012 | Henry et al. | |
| 8,391,466 B1* | 3/2013 | Noble, Jr. | H04M 3/5158 |
| | | | 379/266.07 |
| 8,463,636 B2 | 6/2013 | Ahsan et al. | |
| 8,612,276 B1* | 12/2013 | Nielsen | G06Q 10/063118 |
| | | | 705/7.16 |
| 8,660,877 B2* | 2/2014 | Mitchell | G06Q 10/06311 |
| | | | 705/7.13 |
| 8,799,046 B2* | 8/2014 | Schneur | G06Q 10/063118 |
| | | | 705/7.17 |
| 8,804,941 B2 | 8/2014 | Werth et al. | |
| 8,811,595 B2 | 8/2014 | Werth et al. | |
| 8,880,945 B2 | 11/2014 | Gorecha et al. | |
| 8,948,355 B2 | 2/2015 | Kosseifi et al. | |
| 10,212,121 B2* | 2/2019 | Pan | H04L 51/32 |
| 10,282,683 B2* | 5/2019 | Mitchell | G06Q 10/06 |
| 2002/0010615 A1* | 1/2002 | Jacobs | G06Q 10/063114 |
| | | | 705/7.15 |
| 2004/0133889 A1* | 7/2004 | Colle | G06Q 10/06 |
| | | | 718/100 |
| 2009/0319572 A1 | 12/2009 | Bernard | |
| 2010/0097940 A1 | 4/2010 | Asefa et al. | |
| 2010/0114641 A1* | 5/2010 | Coffman | G06Q 10/06312 |
| | | | 705/7.26 |
| 2012/0259540 A1* | 10/2012 | Kishore | G06Q 10/105 |
| | | | 701/410 |
| 2013/0282418 A1 | 10/2013 | Furman et al. | |
| 2015/0032416 A1 | 1/2015 | Miller | |
| 2016/0149850 A1* | 5/2016 | Pan | H04L 67/22 |
| | | | 709/206 |
| 2017/0011312 A1* | 1/2017 | Subramanian | G06Q 10/067 |
| 2017/0264653 A1 | 9/2017 | Banyai et al. | |
| 2017/0270613 A1 | 9/2017 | Scott et al. | |
| 2017/0337500 A1 | 11/2017 | Harwood | |
| 2019/0392441 A1* | 12/2019 | Lee | G06N 20/00 |

OTHER PUBLICATIONS

Jose, G. Jegan, S. Kumanan, and S. Prasanna Venkatesan. "Optimize Field Service Management through Analytics." Proceedings of the International Conference on Advances in Production and Industrial Engineering. vol. 529. 2015. https://www.researchgate.net/profile/Somasundaram_Kumanan/publication/301294686_Optimize_Field_Service_Management_through_Analytics/links/571086a808ae68dc79097742.pdf.

Souyris, Sebastian, et al. "A robust optimization approach to dispatching technicians under stochastic service times." Optimization Letters 7.7 (2013): 1549-1568. http://citeseerx.ist.psu.edu/viewdoc/download?doi=10.1.1.708.5854&rep=rep1&type=pdf.

Haugen, Dyan L., and Arthur V. Hill. "Scheduling to improve field service quality." Decision Sciences 30.3 (1999): 783-804. http://booksc.xyz/book/9776388/f7a09e.

Collins, John E., and Elizabeth M. Sisley. "Automated assignment and scheduling of service personnel." IEEE Expert 9.2 (1994): 33-39. http://booksc.xyz/book/31794511/c386c6.

* cited by examiner

TELECOMMUNICATION NETWORK CUSTOMER PREMISES SERVICE DISPATCH OPTIMIZATION

The present disclosure relates generally to telecommunication network maintenance, and more particularly to methods, computer-readable media, and devices for determining whether a pending customer premises installation job may include a dispatch of a network-based technician in accordance with a prediction model.

BACKGROUND

In a telecommunication network, the plant (e.g., the wires and equipment that carry customer services) conditions may change from area to area. For instance, in some places, the telecommunication network may be operating at or near capacity, and to add a new customer, new equipment may be provisioned and installed before adding the new customer service. As a result, some installation jobs may include an additional technician dispatch for network-side work to be completed before finishing the installation job with work at the customer premises.

SUMMARY

In one example, the present disclosure provides a method, computer-readable medium, and device for determining whether a pending customer premises installation job may include a dispatch of a network-based technician in accordance with a prediction model. For example, a method may include a processing system having at least one processor obtaining historical job feature data, historical network plant feature data, and historical calendar feature data associated with customer premises installation jobs of a telecommunication network. In one example, the customer premises installation jobs include a dispatch of at least a customer premises technician. In addition, in one example, a plurality of the customer premises installation jobs further include a dispatch of a network-based technician. The processing system may then generate, from the historical job feature data, the historical network plant feature data, and the historical calendar feature data, a prediction model for predicting whether additional customer premises installation jobs of the telecommunication network require a dispatch of a network-based technician. In addition, the processing system may apply the prediction model to job feature data, network plant feature data, and calendar feature data associated with a pending customer premises installation job, determine a likelihood score of whether the pending customer premises installation job require a dispatch of a network-based technician based upon the prediction model, and assign the pending customer premises installation job to a first customer premises technician in accordance with the likelihood score.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer-readable media, and devices for determining whether a pending customer premises installation job may include a dispatch of a network-based technician in accordance with a prediction model. For instance, examples of the present disclosure identify customer premises installation jobs which may require a "helper" (e.g., a network-based technician) in addition to a customer premises technician that is dispatched for all customer premises installation jobs. In addition, examples of the present disclosure attempt to group customer premises installation jobs which may require a network-based technician into "bundles" based upon geographic and network proximity, and then assign bundles to individual network-based technicians (e.g., for a single day of work). By dispatching a network-based technician to address several customer premises installation jobs on a single workday, the network-based technician's time is efficiently utilized in addition to saving travel time and fuel usage, etc. For installation jobs that include work for a network-based technician, a customer premises technician may follow with work to be completed at the actual customer premises. In addition, in one example, installation jobs may be similarly grouped/bundled for different customer premises technicians based upon geographic and network proximity.

In telecommunication network operations, field workforces are experts trained to work on specific segments of the network: technicians who work at the customer premises, and technicians who work on the network infrastructure in the field as well as in the central offices. To optimize technician worktime for all specialties, technician work assignments may be set in advance and may remain fixed during the course of a day. Where jobs change or additional work arrives that needs to be completed, dispatch center agents may seek to schedule additional technician work time to assign the extra work. However, being able to anticipate where this work will arise may allow dispatch center agents to develop better work assignment plans that reduce the need for additional technician work time (e.g., down-time between jobs, travel time, etc.).

Customer installation jobs typically require a single customer premises technician to complete. Occasionally, an additional network-based technician is also needed for the installation job. These installation jobs involve work that the customer premises technician is not skilled to complete, or that requires different resources that are not available to the customer premises technician. However, in many cases, the need for a network-based technician is discovered by the customer premises technician only after the customer premises technician has already traveled to an installation site/customer premises. Dispatch centers address these cases individually, often with manual intervention into the current schedule. For instance, a dispatch center agent may pause the current installation job due to the need of a helper (e.g., a network-based technician), find an available network-based technician, add the job to the available network-based technician's schedule, and then dispatch the available network-based technician. Both technicians are affected by these changes: the customer premises technician's job will take longer to complete than what was anticipated, and the network-based technician's work flow is non-optimal because the work is not scheduled in advance and may involve the network-based technician waiting for work, engaging in excessive travel between distant job sites, or interrupting other scheduled work with additional unscheduled work.

The present disclosure predicts installation jobs that may require additional network-based technician work to establish service for customers. Being able to predict these installation jobs with sufficient accuracy may allow a dispatch agent to schedule the additional work before the actual installation job for the customer (e.g., before the customer premises technician start on the installation at the customer premises). For scheduling the right technician to the right installation job, each installation job has a set of skills requirements: those job skills that are required to complete the work. Technicians also maintain their skills for the kinds of work they are trained to do. A valid job assignment is one where a technician with the appropriate skills is paired with a job's required skills. The present disclosure predicts which future installation jobs that are currently pending may require additional work falling within the skill set of network-based technicians using historical data about previous dispatches, the type of install work to be done, the area and network plant conditions, and the rate of other kinds of maintenance work on the affected network assets.

In one example, the present disclosure may first collect data regarding current and pending customer premises installation jobs in each area (e.g., a neighborhood, a district, a town, a county, a city and so on). In one example, two years of historical data are collected. Next, based on features of previous installation jobs requiring helper work (e.g., network-based technician work) in the area, the present disclosure may create a prediction model, e.g., a gradient boosted machine, for predicting whether future installation jobs will require network-based technician work. In one example, the present disclosure trains the prediction model using data (features) that may be indicative that an installation job might require network-based technician work. The features may broadly fall into three categories of: job feature data, network plant feature data, and calendar feature data. For instance, the data on the availability of network resources for the new job and the rates of maintenance work on those equipment in the past may comprise input data for training the prediction model. In one example, the prediction model is a linear function of these feature values, and the weights for each feature may be learned by the prediction model (e.g., a gradient boosted machine). The present disclosure may then use the output of the linear function from new input data relating to a new/pending installation job to decide whether the job requires proactive work by a network-based technician. In particular, the prediction model may be applied to data regarding pending installation jobs to output a likelihood score for each pending installation job comprising a prediction of how likely it is that the installation job will require network-based technician work.

In addition, once each pending installation job is scored, the present disclosure may group installation jobs together based on spatial proximity and network proximity, as well as the likelihood scores for the respective installation jobs (indicating a likelihood of needing network-based technician work). For instance, installation jobs for different customer premises may be spatially close, but involve different network equipment to deliver services. Conversely, installation jobs that are spatially distant but which terminate in the same network equipment may also be grouped together. Finally, jobs that are spatially proximate and network proximate but which have a low likelihood of needing a network-based technician may also be grouped together (for a customer premises technician, without an additional network-based technician). In one example, the installation jobs are grouped by optimizing in terms of the costs associated with each installation job. Finally, the present disclosure may cluster installation jobs based on the costs of sending one technician in one day to address as many installation jobs as possible. In addition, once actual data is collected and available regarding a completed installation job, the present disclosure may update the prediction model based on the predictive performance of the likelihood score in order to improve predictions for future installation jobs. Thus, by considering probabilistic outcomes in conjunction with proactive scheduling (in advance), the present disclosure changes the way jobs are scheduled for field technicians.

Examples of job feature data include: broad category of work, code for types of install work, code for the type of service being installed, code for the type of network used to deliver services, codes for the geography where the install work is happening (including wire center identification, city, state, postal code, Common Language Location Identifier (CLLI), latitude, longitude, etc.), details about the specific installed work to be assigned (e.g., duration, priority, job category, source type, job type, etc.), details of the work status (assigned, pending, dispatched, cancelled, completed), due dates and access features of the job, and so forth.

Examples of network plant feature data include: network aggregation point CLLI, count of install jobs at digital subscriber line access multiplexer (DSLAM), count of helper jobs at DSLAM, count of reboots at DSLAM, counts of successful and unsuccessful quality check tests at DSLAM, sum of the distance results from quality check tests run at DSLAM, mean distance results from quality check tests run at DSLAM, summary statistics of quality check reported distances at DSLAM, failure and success counts of single-ended loop testing (SELT) tests at DSLAM, weekly summary statistics of reboot and past helpers at DSLAM, latitude and longitude interaction features, counts of different geographical areas, and so forth.

Examples of calendar feature data include: lagging count of helper jobs at the DSLAM, cumulative sum of helper jobs at the DSLAM, mean of the cumulative sum of helper jobs at the DSLAM, rolling sum of lagging helpers (e.g., 1-14 day history), rolling mean of lagging helpers (e.g., 1-14 day history), helper count based on job type at DSLAM, lagged (e.g., 7 day history) helper count by job type at DSLAM, helper cumulative sum by job type at DSLAM (e.g., 7 day history), rolling sum of daily count by job type at DSLAM, helper count based on DSLAM, rolling mean of install work for DSLAM (e.g., 1-14 day history), overall ratio and ratio of helper to install jobs for DSLAM (e.g., 1-14 day history), number of week in month, day of week number, Boolean value indicating holiday, Boolean value indicating national holiday, Boolean value indicating weekday or weekend, and so on.

Figure 1:
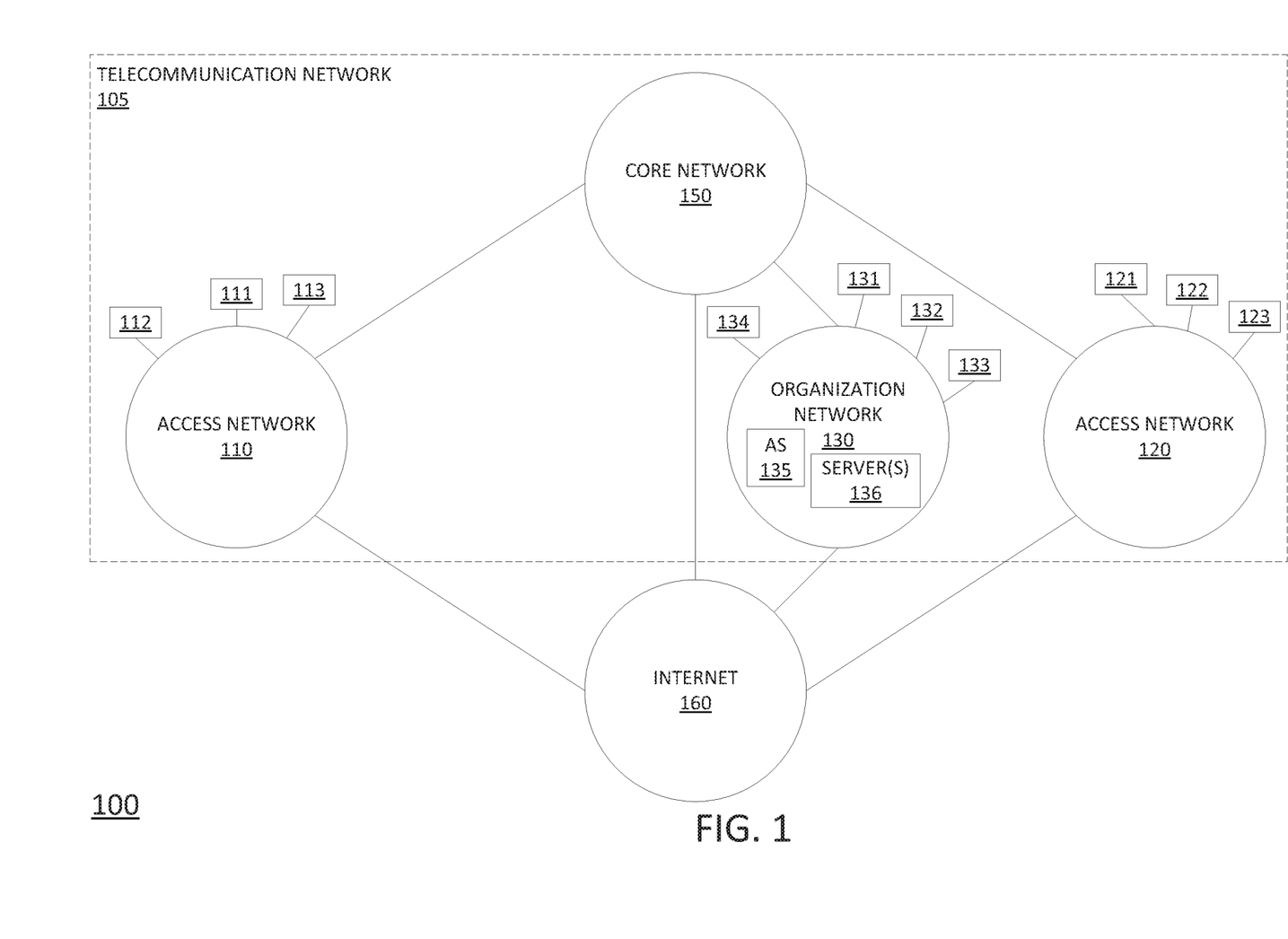
FIG. 1 illustrates one example of a system including a telecommunication network, according to the present disclosure.

To aid in understanding the present disclosure, FIG. 1 illustrates an example system 100 comprising a plurality of different networks for supporting the determining of whether a pending customer premises installation job may include a dispatch of a network-based technician in accordance with a prediction model. Telecommunication network 105 may comprise a core network 150 with components for telephone services, Internet services, and/or television services (e.g., triple-play services, etc.) that are provided to customers (broadly "subscribers"), and to peer networks. In one example, core network 150 may combine core network components of a cellular network with components of a triple-play service network. For example, core network 150 may functionally comprise a fixed mobile convergence (FMC) network, e.g., an IP Multimedia Subsystem (IMS) network. In addition, core network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 150 may also further comprise a broadcast television network, e.g., a traditional cable provider network or an Internet Protocol Television (IPTV) network, as well as an Internet Service Provider (ISP) network. With respect to television service provider functions, core network 150 may include one or more television servers for the delivery of television content, e.g., a broadcast server, a cable head-end, a video-on-demand (VoD) server, and so forth. For example, core network 150 may comprise a video super hub office, a video hub office and/or a service office/central office. For ease of illustration, various components of core network 150 are omitted from FIG. 1.

In one example, access networks 110 and 120 may each comprise a Digital Subscriber Line (DSL) network, a broadband cable access network, or the like. For example, access networks 110 and 120 may transmit and receive communications between endpoint devices 111-113, 121-123, and core network 150 relating to voice telephone calls, communications with web servers via the Internet 160, organization network 130, and so forth. Access networks 110 and 120 may also transmit and receive communications between endpoint devices 111-113, 121-123 and other networks and devices via Internet 160. Endpoint devices 111-113 and 121-123 may each comprise a telephone, e.g., for analog or digital telephony, a mobile device, a cellular smart phone, a laptop, a tablet computer, a desktop computer, a plurality or cluster of such devices, and the like. In some examples, endpoint devices 111-113 and 121-123 may connect to access networks 110 and 120 via one or more intermediate devices, such as a gateway and router, an Internet Protocol private branch exchange (IPPBX), and so forth. In one example, the access networks 110 and 120 may be different types of access networks. In another example, the access networks 110 and 120 may be the same type of access network. In one example, one or more of the access networks 110 and 120 may be operated by the same service provider operating core network 150.

In one example, access networks 110 and 120 may include a plurality of distribution areas (DAs). The distribution areas may include portions of access networks 110 and 120 associated with individual nodes (e.g., fiber optic nodes and/or digital subscriber line access multiplexers (DSLAMs)) and may serve multiple living units (LUs). The living units may include single family homes and businesses, as well as multi-dwelling units (MDUs). The distribution areas may be further associated with different wire centers and/or central offices (COs) (CLLI8) of the telecommunication network 105 and/or access networks 110 and 120. Each distribution area may be a portion of the telecommunication network 105 with fiber to the node (FTTN) or fiber to the curb (FTTC) already deployed (e.g., a hybrid fiber-coaxial (HFC) access network portion), or may comprise regions of the telecommunication network 105 with electrically wired trunks/routes from central offices to nodes (e.g., a DSL access network portion, etc.). In addition, distribution areas may be associated with either overhead utility wiring (aerial) or buried utility wiring (buried).

In one example, an organization network 130 may comprise a local area network (LAN), or a distributed network connected through permanent virtual circuits (PVCs), virtual private networks (VPNs), and the like for providing data and voice communications. In one example, the organization network 130 links one or more endpoint devices 131-134 with each other and with Internet 160, core network 150, devices accessible via such other networks, such as endpoint devices 111-113 and 121-123, and so forth. In one example, endpoint devices 131-134 may each comprise a telephone for analog or digital telephony, a mobile device, a cellular smart phone, a laptop, a tablet computer, a desktop computer, a bank or cluster of such devices, and the like. In one example, the organization network 130 may be associated with the telecommunication network 105. For example, the organization may comprise the telecommunication network service provider, where endpoint devices 131-134 of the organization network 130 may comprise devices of organizational agents, such as customer service agents, marketing personnel, or other employees or representatives who are tasked with addressing customer-facing issues and/or personnel for network maintenance, network repair, construction planning, field technician dispatch, and so forth.

In one example, the system 100 may also include one or more servers 136 in the organization network 130. In one example, the servers 136 may each comprise a computing system, such as computing system 300 depicted in FIG. 3, and may be configured to host one or more centralized system components. It should be noted that in one example, a centralized system component may be hosted on a single server, while in another example, a centralized system component may be hosted on multiple servers, e.g., in a distributed manner. For example, a first centralized system component may comprise a database of customer/subscriber-assigned telephone numbers, while a second centralized system component may comprise a database of customer account data for all or a portion of the customers/subscribers of the telecommunication network 105. Other centralized system components may include a billing system, a customer relationship management (CRM) system, a trouble ticket system, an inventory system (IS), an ordering system, an enterprise reporting system (ERS), an account object (AO) database system, and so forth. In one example, any one or more of the centralized system components may comprise a set of file stores such as a Hadoop® Distributed File System (HDFS™) and/or another cloud/distributed network-based file storage system.

Any one or more of such centralized system components may generate, collect and/or store customer demographic information comprising, for example: a number of household members, age(s), gender(s), subscription plan(s), television viewing preferences, a service address, device type(s), such as a smartphone model, a television model, a home computer model, a set top box model, a router model, and so forth, a billing history, a payment history, purchasing and ordering information, payment methods, employment information, salary information, and so forth. The customer demographic information may be based upon a customer's interactions with the telecommunication network 105. In one example, the customer demographic information may also include information obtained by the telecommunication network 105 from third parties, such as merchants, credit card companies, credit bureaus, and the like.

In one example, servers 136 may include a geodatabase and query system, e.g., PostGIS, CartoDB, ArcGIS, or the like, which may store shapefiles representing wire centers and/or distribution areas of portions of the telecommunication network (e.g., "designated marketing areas"). In one example, one of the servers 136 comprising a database and query system may further include CLLI information regarding different network equipment with various wire centers, central offices, distribution areas, etc. and/or customer demographic information. In one example, servers 136 may also include a field technician dispatch system for receiving work orders/job requests, e.g., for customer premises installation jobs, for tracking assignments of work orders to field technicians and the statuses of different work orders, for interacting with dispatch agent devices (e.g., one of devices 131-134) to allow manual scheduling, assignment of work order, etc., and so on.

Figure 3:
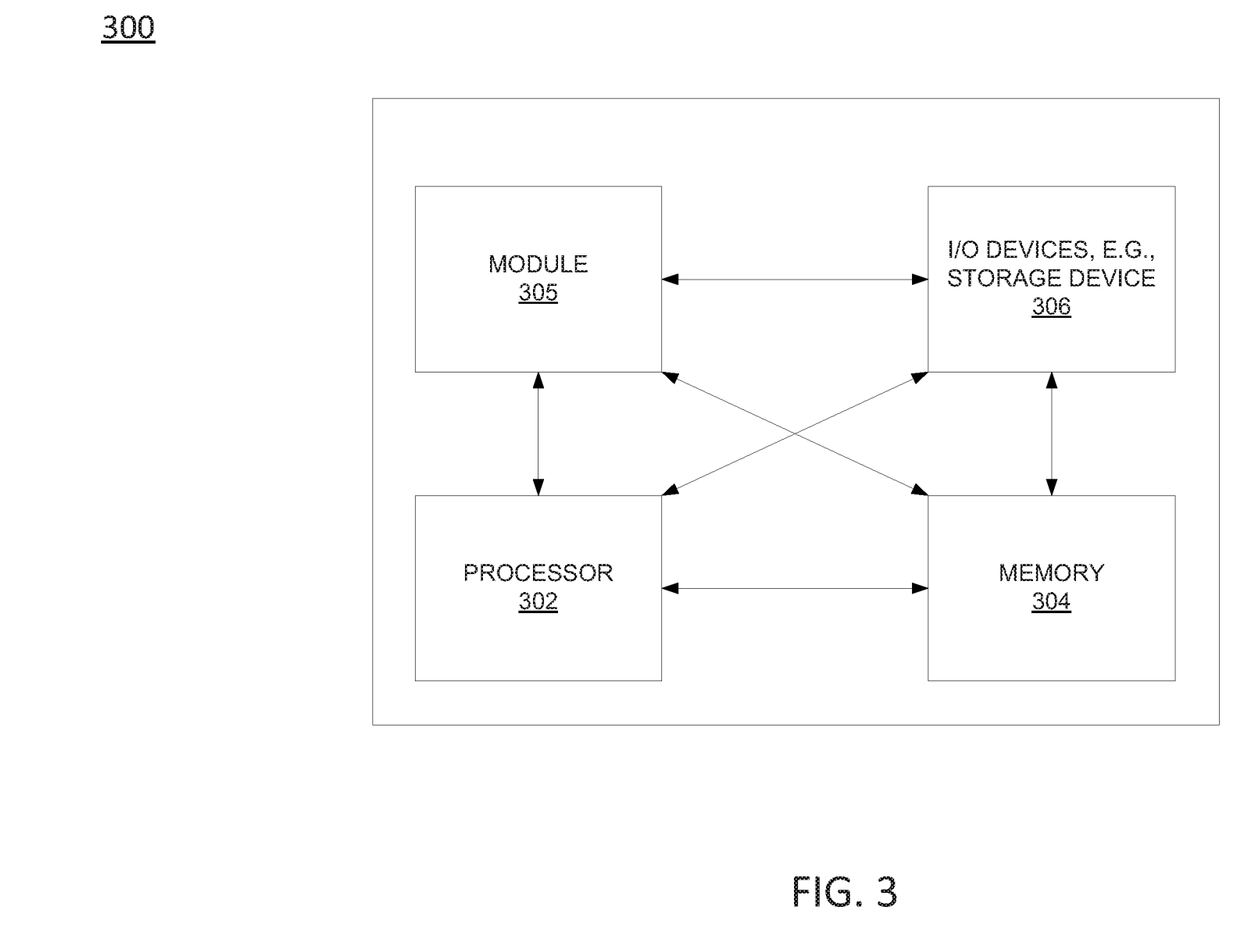
FIG. 3 illustrates a high-level block diagram of a computing device specially programmed to perform the functions described herein.

In one example, organization network 130 may also include an application server (AS) 135. In one example, AS 135 may comprise a computing system, such as computing system 300 depicted in FIG. 3, and may be configured to provide one or more functions for determining whether a pending customer premises installation job may include or require a dispatch of a network-based technician in accordance with a prediction model, in accordance with the present disclosure. For example, AS 135 may be configured to perform one or more steps, functions, or operations in connection with the example method 200 described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, application server 135 may obtain historical job feature data, historical network plant feature data, and historical calendar feature data associated with customer premises installation jobs (e.g., from one or more of servers 136). For instance, the historical data may relate to installation jobs for customer premises associated with endpoint devices 111-113 and 121-123. As discussed above, the customer premises installation jobs include a dispatch of a customer premises technician. In addition, a plurality (e.g., at least a portion) of the customer premises installation jobs may further include a dispatch of a network-based technician. Application server 135 may then generate from the historical job feature data, historical network plant feature data, and historical calendar feature data, a prediction model for predicting whether additional customer premises installation jobs of the telecommunication network may include or require a dispatch of a network-based technician. For example, the prediction model may comprise a linear combination of available features (historical data) and may be trained to learn weights to apply to the respective features. The prediction model may comprise, for example, a gradient boosted machine. In addition, the prediction model may provide an output of a likelihood score indicating how likely it is predicted that the pending customer premises installation job will require network-based technician work.

It should be noted that in other, further, and different examples, the present disclosure may alternatively or additionally train various types of machine learning algorithms (MLAs) from historical job feature data, historical network plant feature data, and historical calendar feature data to generate machine learning models (MLMs)/predictive models for predicting whether a pending customer premises installation job may include a dispatch of a network-based technician, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

In any case, after generating/training the prediction model, application server 135 may then apply the prediction model to job feature data, network plant feature data, and calendar feature data associated with a pending customer premises installation job and determine a likelihood score of whether the pending customer premises installation job may include or require a dispatch of a network-based technician based upon the prediction model. For instance, application server 135 may obtain data regarding a pending customer installation job from various servers 136. For instance, one of servers 136 may comprise a field technician dispatch system maintaining information regarding pending/requested customer installation jobs, another of the application severs 136 may comprise a network provisioning and inventory database, and so forth. Application server 135 may then assign the pending customer premises installation job to a first customer premises technician in accordance with the likelihood score, and may further assign the pending customer premises installation job to a first network-based technician, in accordance with the likelihood score (e.g., when the likelihood score exceeds a threshold). In addition, application server 135 may monitor the installation job and receive an indication of whether the installation job actually included work for the first network-based technician, and may update the prediction model in accordance with the actual outcome of the installation job.

These and other example operations for determining whether a pending customer premises installation job may include a dispatch of a network-based technician in accordance with a prediction model are described in greater detail below in connection with the example of FIG. 2. In addition, it should be realized that the network 100 may be implemented in a different form than that illustrated in FIG. 1, or may be expanded by including additional endpoint devices, access networks, network elements, application servers, etc. without altering the scope of the present disclosure.

Figure 2:
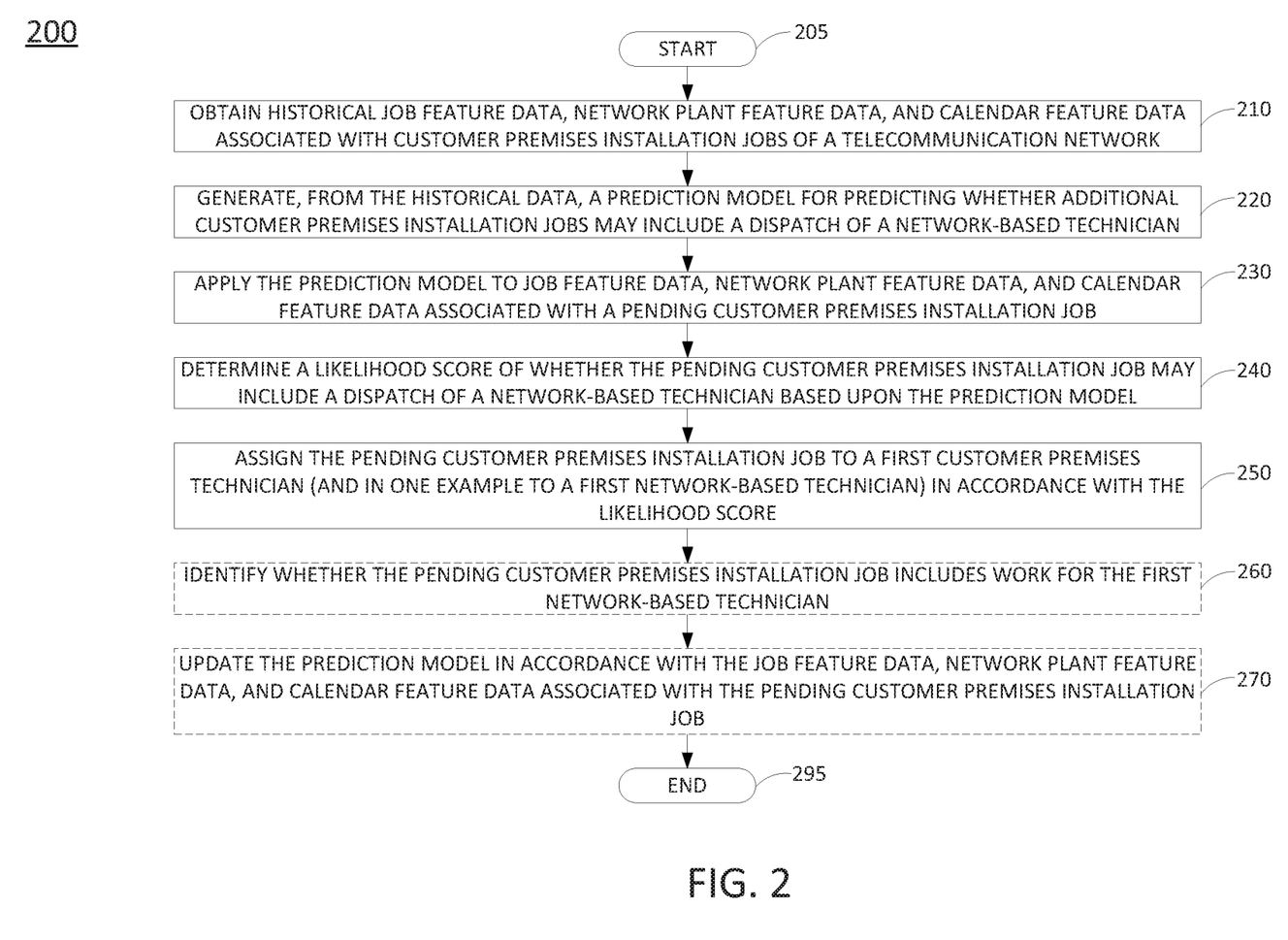
FIG. 2 illustrates a flowchart of an example method for determining whether a pending customer premises installation job may include a dispatch of a network-based technician in accordance with a prediction model.

FIG. 2 illustrates a flowchart of an example method 200 for determining whether a pending customer premises installation job may include a dispatch of a network-based technician in accordance with a prediction model. In one example, the method 200 is performed by a component of the system 100 of FIG. 1, such as by application server 135, and/or any one or more components thereof (e.g., a processor, or processors, performing operations stored in and loaded from a memory), or by application server 135, in conjunction with one or more other devices, such as servers 136, and so forth. In one example, the steps, functions, or operations of method 200 may be performed by a computing device or system 300, and/or processor 302 as described in connection with FIG. 3 below. For instance, the computing device or system 300 may represent any one or more components of application server 135, server 136, etc. in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 300 may collectively function as a processing system. For illustrative purposes, the method 200 is described in greater detail below in connection with an example performed by a processing system.

The method 200 begins at step 205 and proceeds to step 210. At step 210, the processing system obtains historical job feature data, historical network plant feature data, and historical calendar feature data associated with customer premises installation jobs of a telecommunication network. In accordance with the present disclosure, the customer premises installation jobs may include a dispatch of a customer premises technician. In addition, a plurality of the customer premises installation jobs (e.g., at least a portion thereof) may further include a dispatch of a network-based technician. In accordance with the present disclosure a customer premises technician may comprise a technician designated as having a skill set pertaining to installation and configuration of customer premises-based equipment in order for the customer premises to receive telecommunication services from the telecommunication network. Similarly, a network-based technician may comprise a technician designated as having a skill set pertaining to installation and configuration of non-customer premises-based equipment of the telecommunication network that supports telecommunication services for customer premises-based equipment.

In one example, the historical job feature data, historical network plant feature data, and historical calendar feature data may be obtained from various components of the telecommunication network, such as a field technician dispatch system maintaining information regarding pending/requested customer installation jobs, a network provisioning and inventory database, and so forth. In one example, the processing system may obtain the historical data from a data storage system of the telecommunication network (e.g., a centralized or distributed file storage system, such as HDFS). For instance, a field technician dispatch system may only include records for pending jobs or jobs recently completed, whereas historical data, e.g., one year of historical data, two years of historical data, may be offloaded and stored in a long-term data storage system from which the processing system may access the historical data at step 210. Alternatively, or in addition, the historical data may be stored by the processing system. For instance, the data storage system may comprise part of the processing system performing the method 200.

In one example, for each of the customer premises installation jobs, the historical job feature data may comprise any of the types of job feature data mentioned above, e.g., including at least one of: a category of work, a type of work, a type of network associated with the work, a geographic identifier of an area for the work, a priority level for the work, a status of the work, a due date for completion of the work, and so forth. In addition, for each of the customer premises installation jobs, the historical network plant feature data may be associated with a respective network aggregation point for servicing a respective customer premises of the telecommunication network, such as a digital subscriber line access multiplexer (DSLAM), a wire center/central office (CO), and so forth. For instance, for each of the customer premises installation jobs, the historical network plant feature data may comprise any of the types of network plant feature data mentioned above, e.g., including at least one of: an identifier of a network aggregation point, a number of installation jobs associated with multiple customer premises assigned to the network aggregation point, a number of installation jobs associated with multiple customer premises assigned to the network aggregation point including a dispatch of a network-based technician, a number of reboots at the network aggregation point, a number of successful quality check tests at the network aggregation point, a number of unsuccessful quality check tests at the network aggregation point, and so forth. Similarly, for each of the customer premises installation jobs, the historical calendar feature data may comprise any of the types of calendar feature data mentioned above, e.g., including at least one of: a day of a week, a week of a month, a holiday indicator, a weekend/weekday indicator, and so on.

At step 220, the processing system generates, from the historical job feature data, historical network plant feature data, and historical calendar feature data, a prediction model for predicting whether additional customer premises installation jobs of the telecommunication network may include or require a dispatch of a network-based technician. In one example, the prediction model is a linear function of these feature values, and the weights for each feature may be learned by the prediction model. In one example, the prediction model comprises a gradient boosted machine.

At step 230, the processing system applies the prediction model to job feature data, network plant feature data, and calendar feature data associated with a pending customer premises installation job. For instance, the job feature data, network plant feature data, and calendar feature data associated with the pending customer premises installation job may be obtained from various components of the telecommunication network, such as a field technician dispatch system maintaining information regarding pending/requested customer installation jobs, a network provisioning and inventory database, and so forth.

At step 240, the processing system determines a likelihood score of whether the pending customer premises installation job may include or require a dispatch of a network-based technician based upon the prediction model. For instance, the prediction model may provide an output of a likelihood score indicating how likely it is predicted that the pending customer premises installation job will require network-based technician work.

At step 250, the processing system assigns the pending customer premises installation job to a first customer premises technician in accordance with the likelihood score. In one example, step 250 may further include assigning the pending customer premises installation job to a first network-based technician, in accordance with the likelihood score. In one example, step 250 may include identifying a plurality of pending customer premises installation jobs (e.g., including the pending customer premises installation job) having geographic proximity and network proximity, and assigning the plurality of pending customer premises installation jobs having the geographic proximity and the network proximity to the first network-based technician. For instance, the plurality of pending customer premises installation jobs may be "bundled" for the same network-based technician when determined to be geographically and/or network proximate, and in addition when each of plurality of pending customer premises installation jobs is determined to have a respective likelihood score based upon the prediction model that exceeds a threshold.

In one example, the performance of the prediction model may be measured from actual historical data to estimate the probability of the prediction model's success. In one example, the bundle size may be estimated in accordance with Equation 1: $P(a)=\binom{n}{k}p^k q^{n-k}$, where P(a) is the probability of k successes in n trials. In one example, k may be set to k=1 or at least one success. Solving fork gives the number of jobs to assign to single technician. For instance, with a greater probability of success (higher prediction accuracy) less jobs should be scheduled to a network-based technician. However, with a lower probability of success (lower prediction accuracy) more jobs should be scheduled to the network-based technician. In particular, each installation job that is correctly predicted to have network-side work is presumed to result in a greater quantity of actual work to the network-based technician assigned to the job. On the other hand, for each false positive it may be assumed that although the network-based technician may travel to a job site, the technician may quickly evaluate that network-side work is not needed and move to the next scheduled job.

The geographic proximity may comprise a threshold distance between customer premises associated with the plurality of pending customer premises installation jobs (e.g., within a 10 mile radius), or within a threshold distance between jobs in a temporal sequence (e.g., a next job being scheduled to be no more than 2 miles from a previous job), and so forth. The network proximity comprises at least one of: a same wire center/CLLI8 region, a same distribution area or an adjacent distribution area, and so forth.

At optional step 260, the processing system may identify whether the pending customer premises installation job includes work for the first network-based technician. In one example, optional step 260 may include identifying whether the determining of step 240 is accurate. For instance, the first network-based technician may report back as to whether the prediction of step 240 is accurate and whether there is actual work for the first network-based technician to complete for the customer premises installation job.

At optional step 270, the processing system may update the prediction model in accordance with the job feature data, network plant feature data, and calendar feature data associated with the pending customer premises installation job. For instance, the pending customer premises installation job may be used as an additional positive example or negative example based upon the accuracy of the prediction of step 240 as compared to the actual result identified at optional step 260.

Following step 250, or either of optional steps 260-270, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example the processor may repeat one or more steps of the method 200, such as steps 230-250, steps 230-270 and so forth. In another example, the performance of the prediction model, e.g., in accordance with Equation 1, may be performed as part of step 220, e.g., as an alternative or in addition to being performed at step 250. In another example, network proximity may serve as in indication of geographic proximity. For instance, if installation jobs relate to a same wire center/CLLI8 region, it may be assumed that the installation jobs are also geographically proximate. In still another example, the bundling of multiple pending installation jobs for a single technician (e.g., for a single network-based technician) may further account for specific skills or equipment anticipated to be required. For instance, the telecommunication network operator may maintain pools of network-based technicians with different sets of skills (e.g., overhead distribution versus buried fiber to the premises (FTTP)), and the processing system may further refine the prediction to include a prediction of specific skills which may be required for each pending customer installation job. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for determining whether a pending customer premises installation job may include a dispatch of a network-based technician in accordance with a prediction model, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for determining whether a pending customer premises installation job may include a dispatch of a network-based technician in accordance with a prediction model (e.g., a software program comprising computer-executable instructions) can be loaded into memory 304 and executed by hardware processor element 302 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for determining whether a pending customer premises installation job may include a dispatch of a network-based technician in accordance with a prediction model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, historical job feature data, historical network plant feature data, and historical calendar feature data associated with customer premises installation jobs of a telecommunication network, wherein the customer premises installation jobs include a dispatch of one of a plurality of customer premises technicians, wherein a plurality of the customer premises installation jobs further includes a dispatch of one of a plurality of network-based technicians;
    generating, by the processing system from the historical job feature data, the historical network plant feature data, and the historical calendar feature data, a prediction model for predicting whether additional customer premises installation jobs of the telecommunication network require a dispatch of a network-based technician, wherein the prediction model comprises a gradient boosted machine, wherein the gradient boosted machine comprises a linear function of job feature data, network plant feature data, and calendar feature data, and wherein weights for the job feature data, the network plant feature data, and the calendar feature data feature are learned by the gradient boosted machine in accordance with the historical job feature data, the historical network plant feature data, and the historical calendar feature data;
    applying, by the processing system, the prediction model to job feature data, network plant feature data, and calendar feature data associated with a pending customer premises installation job;
    determining, by the processing system, a likelihood score of whether the pending customer premises installation job requires a dispatch of a network-based technician based upon the prediction model; and
    assigning, by the processing system, the pending customer premises installation job to a first network-based technician in accordance with the likelihood score via a field technician dispatch system, wherein the assigning includes assigning a plurality of customer premises installation jobs including the pending customer premises installation job to the first network-based technician, wherein a number of the plurality of customer premises installation jobs is selected in accordance with an accuracy of the prediction model, wherein the number is greater when the accuracy of the prediction model is lesser as compared to when the accuracy of the prediction model is greater.

2. The method of claim 1, wherein the assigning further comprises:
    assigning the pending customer premises installation job to a first customer premises technician.

3. The method of claim 2, further comprising:
    identifying the pending customer premises installation job includes work for the first network-based technician; and
    updating the prediction model in accordance with the job feature data, the network plant feature data, and the calendar feature data associated with the pending customer premises installation job.

4. The method of claim 2, wherein the assigning further comprises:
    identifying a plurality of pending customer premises installation jobs having geographic proximity and network proximity, wherein the plurality of pending customer premises installation jobs includes the pending customer premises installation job; and assigning the plurality of pending customer premises installation jobs having the geographic proximity and the network proximity to the first network-based technician.

5. The method of claim 4, wherein each of the plurality of pending customer premises installation jobs is determined to have a respective likelihood score based upon the prediction model that exceeds a threshold.

6. The method of claim 4, wherein the geographic proximity comprises a threshold distance between customer premises associated with the plurality of pending customer premises installation jobs.

7. The method of claim 4, wherein the network proximity comprises at least one of:
   a same wire center;
   a same distribution area; or
   an adjacent distribution area.

8. The method of claim 1, wherein for each of the customer premises installation jobs, the historical job feature data comprises at least one of:
   a category of work;
   a type of work;
   a type of network associated with the work;
   a geographic identifier of an area for the work;
   a priority level for the work;
   a status of the work; or
   a due date for completion of the work.

9. The method of claim 1, wherein for each of the customer premises installation jobs, the historical network plant feature data is associated with a respective network aggregation point for servicing a respective customer premises of the telecommunication network.

10. The method of claim 9, wherein for each of the customer premises installation jobs, the historical network plant feature data comprises:
   an identifier of a network aggregation point;
   a number of installation jobs associated with customer premises assigned to the network aggregation point;
   a number of installation jobs associated with customer premises assigned to the network aggregation point including a dispatch of a network-based technician;
   a number of reboots at the network aggregation point;
   a number of successful quality check tests at the network aggregation point; or
   a number of unsuccessful quality check tests at the network aggregation point.

11. The method of claim 1, wherein for each of the customer premises installation jobs, the historical calendar feature data comprises at least one of:
   a day of a week;
   a week of a month;
   a holiday indicator; or
   a weekend/weekday indicator.

12. The method of claim 1, wherein each of the plurality of customer premises technicians comprises:
   a technician designated as having a skill set pertaining to installation and configuration of customer premises-based equipment to receive telecommunication services from the telecommunication network.

13. The method of claim 1, wherein each of the plurality of network-based technicians comprises:
   a technician designated as having a skill set pertaining to installation and configuration of non-customer premises-based equipment of the telecommunication network that supports telecommunication services for customer premises-based equipment.

14. A non-transitory computer-readable medium storing instructions which, when executed by a processing system including at least one processor, cause the processing system to perform operations, the operations comprising:
   obtaining historical job feature data, historical network plant feature data, and historical calendar feature data associated with customer premises installation jobs of a telecommunication network, wherein the customer premises installation jobs include a dispatch of one of a plurality of customer premises technicians, wherein a plurality of the customer premises installation jobs further includes a dispatch of one of a plurality of network-based technicians;
   generating, from the historical job feature data, the historical network plant feature data, and the historical calendar feature data, a prediction model for predicting whether additional customer premises installation jobs of the telecommunication network require a dispatch of a network-based technician, wherein the prediction model comprises a gradient boosted machine, wherein the gradient boosted machine comprises a linear function of job feature data, network plant feature data, and calendar feature data, and wherein weights for the job feature data, the network plant feature data, and the calendar feature data feature are learned by the gradient boosted machine in accordance with the historical job feature data, the historical network plant feature data, and the historical calendar feature data;
   applying the prediction model to job feature data, network plant feature data, and calendar feature data associated with a pending customer premises installation job;
   determining a likelihood score of whether the pending customer premises installation job requires a dispatch of a network-based technician based upon the prediction model; and
   assigning the pending customer premises installation job to a first network-based technician in accordance with the likelihood score via a field technician dispatch system, wherein the assigning includes assigning a plurality of customer premises installation jobs including the pending customer premises installation job to the first network-based technician, wherein a number of the plurality of customer premises installation jobs is selected in accordance with an accuracy of the prediction model, wherein the number is greater when the accuracy of the prediction model is lesser as compared to when the accuracy of the prediction model is greater.

15. The non-transitory computer-readable medium of claim 14, wherein the assigning further comprises assigning the pending customer premises installation job to a first customer premises technician.

16. The non-transitory computer-readable medium of claim 15, wherein the operations further comprise:
   identifying the pending customer premises installation job includes work for the first network-based technician; and
   updating the prediction model in accordance with the job feature data, the network plant feature data, and the calendar feature data associated with the pending customer premises installation job.

17. The non-transitory computer-readable medium of claim 14, wherein each of the plurality of customer premises technicians comprises:
   a technician designated as having a skill set pertaining to installation and configuration of customer premises-based equipment to receive telecommunication services from the telecommunication network.

18. The non-transitory computer-readable medium of claim 14, wherein each of the plurality of network-based technicians comprises:
a technician designated as having a skill set pertaining to installation and configuration of non-customer premises-based equipment of the telecommunication network that supports telecommunication services for customer premises-based equipment.

19. A device comprising:
a processor system including at least one processor; and
a computer-readable medium storing instructions which, when executed by the processing system, cause the processing system to perform operations, the operations comprising:
obtaining historical job feature data, historical network plant feature data, and historical calendar feature data associated with customer premises installation jobs of a telecommunication network, wherein the customer premises installation jobs include a dispatch of one of a plurality of customer premises technicians, wherein a plurality of the customer premises installation jobs further includes a dispatch of one of a plurality of network-based technicians;
generating, from the historical job feature data, the historical network plant feature data, and the historical calendar feature data, a prediction model for predicting whether additional customer premises installation jobs of the telecommunication network require a dispatch of a network-based technician, wherein the prediction model comprises a gradient boosted machine, wherein the gradient boosted machine comprises a linear function of job feature data, network plant feature data, and calendar feature data, and wherein weights for the job feature data, the network plant feature data, and the calendar feature data feature are learned by the gradient boosted machine in accordance with the historical job feature data, the historical network plant feature data, and the historical calendar feature data;
applying the prediction model to job feature data, network plant feature data, and calendar feature data associated with a pending customer premises installation job;
determining a likelihood score of whether the pending customer premises installation job requires a dispatch of a network-based technician based upon the prediction model; and
assigning the pending customer premises installation job to a first network-based technician in accordance with the likelihood score via a field technician dispatch system, wherein the assigning includes assigning a plurality of customer premises installation jobs including the pending customer premises installation job to the first network-based technician, wherein a number of the plurality of customer premises installation jobs is selected in accordance with an accuracy of the prediction model, wherein the number is greater when the accuracy of the prediction model is lesser as compared to when the accuracy of the prediction model is greater.

* * * * *